United States Patent [19]

Tashiro et al.

[11] Patent Number: 5,225,395
[45] Date of Patent: Jul. 6, 1993

[54] SUPERVISORY SYSTEM FOR SUPERCONDUCTIVE TRANSFORMER

[75] Inventors: Ikuo Tashiro, Yokohama; Daisuke Ito, Kokubunji; Mituyoshi Morohoshi, Kawasaki, all of Japan

[73] Assignee: Kabushiki Kaisha Toshiba, Kawasaki, Japan

[21] Appl. No.: 835,560

[22] Filed: Feb. 14, 1992

Related U.S. Application Data

[63] Continuation-in-part of Ser. No. 560,824, Jul. 31, 1990, abandoned.

[30] Foreign Application Priority Data

Aug. 11, 1989 [JP] Japan .................. 1-208810

[51] Int. Cl.$^5$ .................. H01B 12/00; H01L 39/12; G06F 15/56
[52] U.S. Cl. .................. 505/1; 324/71.6; 361/19; 364/483; 364/550
[58] Field of Search .................. 324/71.6, 71.1, 546, 324/718, 248; 361/19, 141; 364/480, 481, 483, 550; 505/1

[56] References Cited

U.S. PATENT DOCUMENTS

| | | | |
|---|---|---|---|
| 4,140,021 | 2/1979 | Nomura et al. | 361/19 X |
| 4,271,443 | 6/1981 | Nother | 361/19 |
| 4,349,853 | 9/1982 | Sato | 361/19 |
| 4,371,943 | 2/1983 | Woods et al. | 364/481 |
| 4,654,806 | 3/1987 | Poyser et al. | 364/481 X |
| 4,689,707 | 8/1987 | Schwall | 361/19 |
| 4,754,405 | 6/1988 | Foster | 364/550 X |
| 4,764,837 | 8/1988 | Jones | 361/19 |
| 4,777,437 | 10/1988 | Tashiro et al. | 361/19 |
| 4,994,935 | 2/1991 | Takechi | 361/19 |
| 4,996,472 | 2/1991 | Mallick, Jr. | 361/141 X |
| 5,063,472 | 11/1991 | Van Doan et al. | 361/19 |

FOREIGN PATENT DOCUMENTS 0205924  4/1988  European Pat. Off. .

OTHER PUBLICATIONS

"Considerations About the Electrical Supervision of the Superconducting Field Winding of a 320kVA Synchronous Generator"; ICEM 1984; Bischof et al.
Patent Abstracts of Japan, vol. 13, No. 321 (E-790)(3669) Jul. 20, 1989 & JP-A-1 089 412 (Hitachi) Apr. 3, 1989.

*Primary Examiner*—Kevin J. Teska
*Attorney, Agent, or Firm*—Oblon, Spivak, McClelland, Maier & Neustadt

[57] ABSTRACT

A supervisory system is used for a superconductive transformer which comprises primary to Nth-order windings (N is an integer of not less than 2) windings, and the windings are formed of superconductive lines and are wound around an outer surface of a signal core. The supervisory system can detect quench occurring in the windings. The supervisory system includes N voltage sensors for detecting terminal voltages of the windings of the superconductive transformer, N current sensors for detecting currents of the windings, a magnetic flux detector mounted on the core of the transformer, and a discriminator for discriminating a quenched one of the windings on the basis of change patterns unique to output signals from the voltage sensors, output signals from the current sensors, and an output signal from the magnetic flux detector, and a switch for cutting off supply of an electrical power to the superconductive transformer according to an output signal from the discriminator.

15 Claims, 5 Drawing Sheets

SUPERVISORY SYSTEM FOR SUPERCONDUCTIVE TRANSFORMER

CROSS-REFERENCE TO THE RELATED APPLICATIONS

This application is a continuation-in-part of U.S. patent application Ser. No. 07/560,824, filed on Jul. 31, 1990 now abandoned.

BACKGROUND OF THE INVENTION

1. Field of the Invention

The present invention relates to a supervisory system for a superconductive transformer and, more particularly, to a supervisory system which can detect quench of a plurality of windings constituted by superconductive lines in a short response time.

2. Description of the Related Art

In recent years, various superconductive lines with less AC loss have been developed. By constituting primary, secondary, . . . , Nth-order windings using such superconductive lines, attempts have been made to make a transformer compact and to reduce a copper loss.

In a so-called "superconductive transformer" in which primary, secondary, . . . , Nth-order windings are constituted by superconductive lines, when a current exceeding a critical current flows through the superconductive lines constituting the windings due to short-circuiting during an operation of the transformer, the corresponding windings are quenched. Once the quench occurs, the resistances of the windings are increased. For this reason, the superconductive transformer loses a function of an AC power transformer. Therefore, when the quench locally occurs, the superconductive transformer must be disconnected from a power source as soon as possible to prevent the quench of the remaining portion, and it must be waited until the quenched portion is recovered to a superconductive state. In order to perform such control, whether or not superconductive lines constituting the windings are quenched must be detected by any section.

As a method of detecting a quenched winding which is formed of the superconductive line and is used in an AC excitation state, a method of detecting the quench based on a phase relationship between a terminal voltage of the winding and a current flowing through the winding is known. This method utilizes the following phenomenon. That is, when the winding is excited with an AC voltage and when the winding is in a superconductive state, a phase difference of $\pi/2$ is accurately present between the voltage and the current. However, when the winding is quenched, the phase difference between the voltage and the current is decreased below $\pi/2$.

However, this method cannot be applied when a superconductive transformer is used. More specifically, in the superconductive transformer, a phase difference between a voltage and a current changes depending on types of load. When a load consists of only resistive components, there is no phase difference ($=0$); when a load consists of inductive components, the phase difference is approximate to $\pi/2$. For this reason, a phase difference caused by the quench cannot be discriminated. For these reasons, demand has arisen for a supervisory system which can detect quenched windings of the superconductive transformer in a short response time.

As described above, the conventional section cannot detect quenched windings of the superconductive transformer in principle.

SUMMARY OF THE INVENTION

It is an object of the present invention to provide supervisory system of a superconductive transformer which can detect quench while discriminating a quenched winding, and can disconnect the superconductive transformer from a power source as soon as possible.

In order to achieve the above object, a supervisory system according to an aspect of the present invention detects, by the following arrangement, quench occurring in a superconductive transformer which comprises primary to Nth-order (N is an integer not less than 2) windings, and in which each winding is formed of a superconductive line, and is wound around an outer surface of a single core. That is, the supervisory system for the superconductive transformer comprises N voltage detection sections for detecting terminal voltages across the windings, N current detection section for detecting winding currents, a magnetic flux detection section mounted on the core, and a discrimination section for discriminating a quenched winding based on unique change patterns of the outputs from the N voltage detection sections, the outputs from the N current detection sections, and the output from the magnetic flux detection section. The supervisory system further comprises a disconnection section for disconnecting the superconductive transformer from a power source based on the output from the discrimination section as post-processing of discrimination.

Additional objects and advantages of the invention will be set forth in the description which follows, and in part will be obvious from the description, or may be learned by practice of the invention. The objects and advantages of the invention ma be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 4:
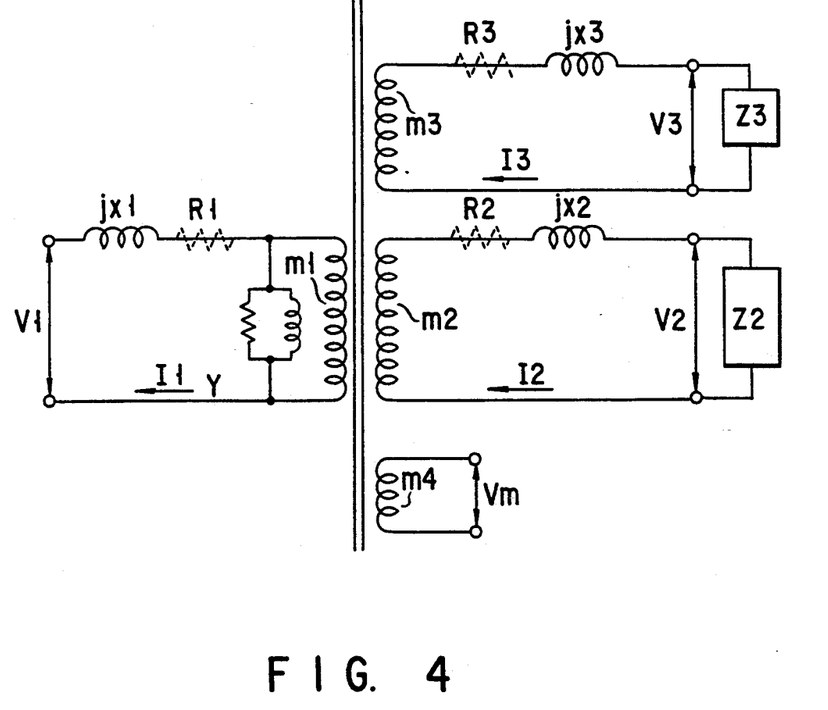
FIG. 4 is an equivalent circuit diagram of the superconductive transformer.

For the sake of simplicity, a superconductive transformer comprising up to a tertiary winding will be exemplified below. FIG. 4 shows an equivalent circuit of the superconductive transformer comprising up to the tertiary winding.

In FIG. 4, reference symbol m1 denotes a primary winding; m2, a secondary winding; m3, a tertiary winding; and m4, a winding serving as the above-mentioned magnetic flux detection section. Symbols in FIG. 4 are defined as follows:

v1: Primary winding voltage
v2: Secondary winding voltage
v3: Tertiary winding voltage
Vm: Magnetic flux detection winding voltage
R1: Primary winding resistance
R2: Secondary winding resistance
R3: Tertiary winding resistance
I1: Primary winding current
I2: Secondary winding current
I3: Tertiary winding current
jX1: Primary winding reactance
jX2: Secondary winding reactance
jX3: Tertiary winding reactance
Y Excitation admittance In this transformer, impedance leakage components (R1+jX1, R2+jX2, R3+jX3) of the primary, secondary, and tertiary windings will never be changed.

In the transformer using superconductive lines as windings, when the primary winding is quenched, for example, the resistance R1 of the primary winding is increased to several hundreds of times that in a steady state. In this case, the secondary winding voltage V2, the tertiary winding voltage V3, and the magnetic flux detection winding voltage Vm are considerably decreased. In addition, the primary, secondary, and tertiary winding currents I1, I2, and I3 are also considerably decreased.

When the secondary winding is quenched, the resistance of the secondary winding R2 is increased to several hundreds of times that in a steady state. Therefore, the secondary winding voltage V2 and the secondary winding current I2 are decreased. However, the primary winding voltage V1 and the magnetic flux detection winding voltage Vm are not decreased.

Furthermore, when the tertiary winding is quenched, the resistance R3 of the tertiary winding is increased to several hundreds of times that in a steady state. However, the primary winding voltage V1 and the magnetic flux detection winding voltage Vm are left unchanged.

Table 1 below summarizes these phenomena. Note that a mark →represents that a value is unchanged before and after quench occurs, and a mark ↓ represents that the value is decreased.

TABLE 1

|    | Primary Winding Quench | Secondary Winding Quench | Tertiary Winding Quench | ... | Nth-order Winding Quench |
|----|------------------------|--------------------------|-------------------------|-----|--------------------------|
| V1 | →                      | →                        | →                       | ... | →                        |
| V2 | ↓                      | ↓                        | →                       | ... | →                        |
| V3 | ↓                      | →                        | ↓                       | ... | →                        |
| .  | .                      | .                        | .                       | ... |                          |
| .  | .                      | .                        | .                       | ... |                          |
| .  | .                      | .                        | .                       | ... |                          |
| Vn | ↓                      | →                        | →                       | ... | ↓                        |
| Vm | ↓                      | →                        | →                       | ... | →                        |
| I1 | ↓                      | ↓                        | ↓                       | ... | ↓                        |
| I2 | ↓                      | ↓                        | →                       | ... | →                        |
| I3 | ↓                      | →                        | ↓                       | ... | →                        |
| .  | .                      | .                        | .                       | ... |                          |
| .  | .                      | .                        | .                       | ... |                          |
| .  | .                      | .                        | .                       | ... |                          |
| In | ↓                      | →                        | →                       | ... | ↓                        |

As can be seen from Table 1, change patterns of V1, V2, V3, Vm, I1, I2, and I3 when the primary, secondary, and tertiary windings are quenched are different from each other. More specifically, when a certain winding is quenched, V1, V2, V3, Vm, I1, I2, and I3 are changed in patterns unique to the winding.

In the system of the present invention, V1, V2, V3, Vm, I1, I2, and I3 are detected, and their feature change patterns are recognized by a discrimination section based on these voltages and currents, thus specifying a quenched winding. When a given winding is quenched, the superconductive transformer is disconnected from a power source as soon as possible.

In another embodiment of the present invention, a voltage drop Vr1 caused by the primary winding resistance R1, a voltage drop Vr2 caused by the secondary winding resistance R2, and a voltage drop Vr3 caused by the tertiary winding resistance R3 are calculated by the discrimination section using the following equations on the basis of V1, V2, V3, Vm, I1, I2, and I3, and jX1, jX2, and jX3 which are discriminated in advance. When this voltage drop Vr1, Vr2, or Vr3 falls outside a predetermined range, it is determined that quench occurs in the corresponding winding.

$$Vr1 = I1 \cdot R1 = V1 - Vm - jX1 \cdot I1 \quad (1)$$

$$Vr2 = I2 \cdot R2 = Vm - V2 - jX2 \cdot I2 \quad (2)$$

$$Vr3 = I3 \cdot R3 = Vm - V3 - jX3 \cdot I3 \quad (3)$$

Vm in equation (1) imitates a primary winding induced voltage, Vm in equation (2) imitates a secondary winding induced voltage, and Vm in equation (3) imitates tertiary winding induced voltage. Vr1, Vr2, and Vr3 are calculated in consideration of a ratio of the number of turns of windings, and vectors in practice. In this case, the vectors are not taken into consideration, and voltage drops are calculated based on simple equations (1) to (3). With this calculation method, when a given winding is quenched, a voltage drop caused by the resistance of the corresponding winding is increased, and the quenched winding can be immediately detected.

FIRST EMBODIMENT

Figure 1:
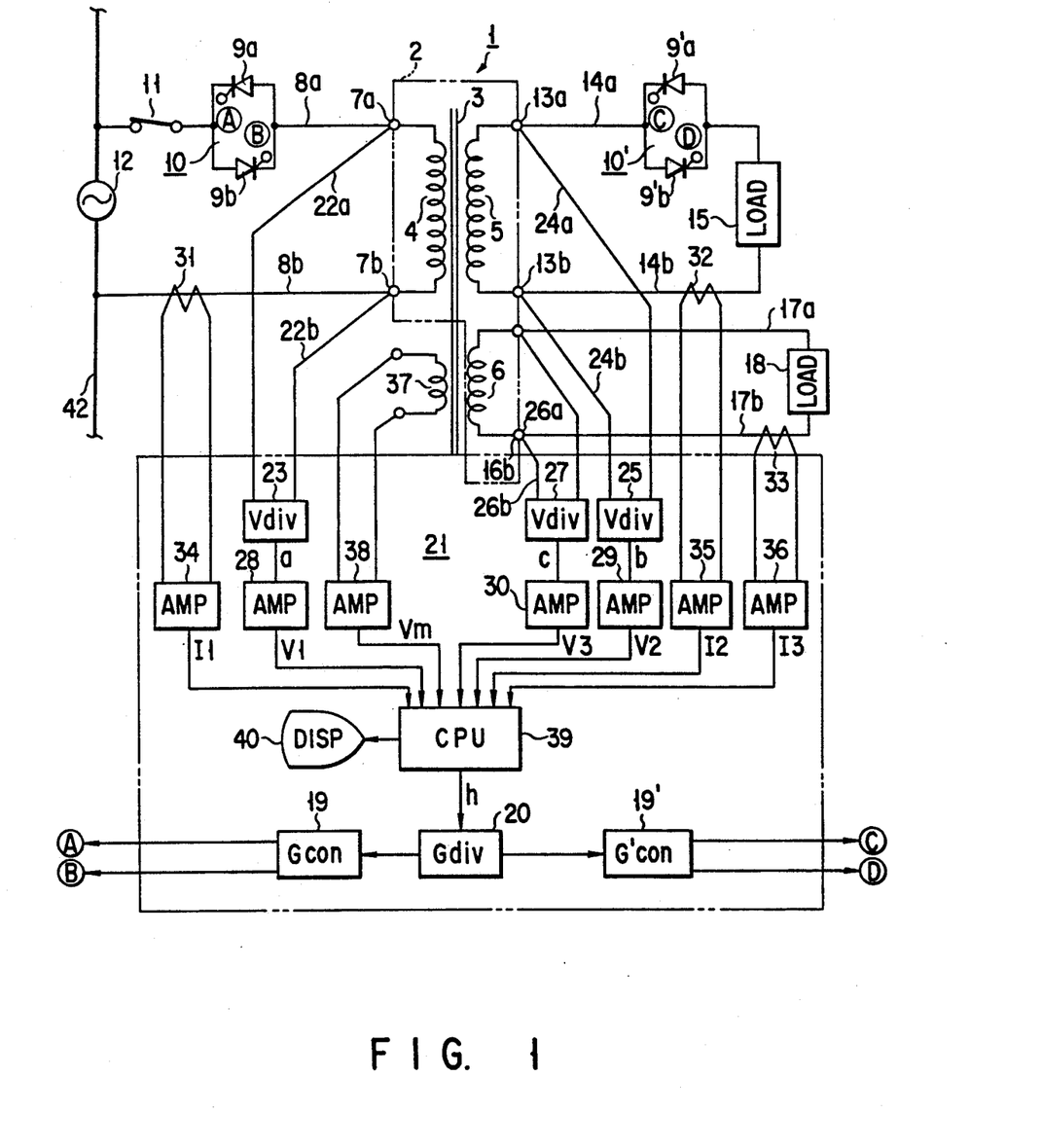
FIG. 1 is a circuit diagram of a supervisory system for a superconductive transformer according to an embodiment of the present invention.

The structural relationship between a quench supervisory system 21 and a superconductive transformer 1 according to the first embodiment of the present invention shown in the circuit diagram of FIG. 1 is as follows.

The superconductive transformer 1 comprises a core 3 which is arranged in a cryostat 2 storing a cryogenic coolant to be thermally insulated from the coolant, a primary winding 4 formed of a superconductive line dipped in the coolant and wound around the outer surface of the core 3, a secondary winding 5 formed of a superconductive line dipped in the coolant and wound around the outer surface of the core 3, and a tertiary winding 6 formed of a superconductive line dipped in the coolant and wound around the outer surface of the core 3.

Two ends 7a and 7b of the primary winding 4 are formed of formal conductive lines. The other-end portions of these lead lines 8a and 8b extend outside the cryostat 2, and are connected to output terminals of an AC power source 12 through a semiconductor switch 10 constituted by inverse-parallel connecting thyristors 9a and 9b, and a mechanical switch 11.

Two ends 13a and 13b of the secondary winding 5 are also connected to one-end portions of lead lines 14a and 14b formed of normal conductive lines. The other-end portions of the lead lines 14a and 14b extend outside the cryostat 2 and are connected to the two terminals of a load 15.

Similarly, two ends 16a and 16b of the tertiary winding 6 are connected to one-end portions of lead lines 17a and 17b formed of normal conductive lines. The other-end portions of these lead lines 17a and 17b extend outside the cryostat 2, and are connected to two terminals of a load 18.

The thyristors 9a and 9b constituting the semiconductor switch 10 are firing-controlled by a gate control circuit 19, so that they can supply an AC current to the superconductive transformer 1 as a load. The gate control circuit 19 is driven by a gate drive circuit 20. When the gate drive circuit 20 receives a signal h at its control terminal, its operation is stopped. The signal h is supplied from the supervisory system 21 to be described below.

The supervisory system 21 is arranged as follows. More specifically, the supervisory system 21 comprises a voltage divider 23 connected to the other-end portions of signal lines 22a and 22b whose one-end portions are connected to the two ends 7a and 7b of the primary winding 4, and a voltage divider 25 connected to the other end portions of signal lines 24a and 24b whose one-end portions are connected to the two ends 13a and 13b of the secondary windings 5. The system 21 also comprises a voltage divider 27 connected to the other-end portions of signal lines 26a and 26b whose one-end portions are connected to the two ends 16a and 16b of the tertiary winding 6.

The voltage divider 23 outputs a voltage ½ the terminal voltage of the primary winding 4. If a ratio of the numbers of turns of the primary and secondary windings 4 and 5 is assumed to be 1:S, the voltage divider 25 outputs a voltage $1/(n \cdot S)$ the terminal voltage of the secondary winding 5. If a ratio of the numbers of turns of the primary and tertiary windings 4 and 6 is assumed to be 1:S', the voltage divider 27 outputs a voltage $1/(n \cdot S')$ the terminal voltage of the tertiary winding 6. Output voltages a, b, and c of the voltage dividers 23, 25, and 27 are converted into signals V1, V2, and V3 via insulated amplifiers 28, 29, and 30. Current sensors 31, 32, and 33 are inserted in the input line of the primary winding 4, the output line of the secondary winding 5, and the output line of the tertiary winding 6. The outputs of these current sensors 31, 32, and 33 are converted into signals I1, I2, and I3 via insulated amplifiers 34, 35, and 36.

A winding for obtaining a voltage for imitating induced voltages of the windings. i.e., a magnetic flux detection winding 37 is wound around the core 3 of the superconductive transformer 1. The output from the magnetic flux detection winding 37 is converted into a signal Vm via an insulated amplifier 38. The signals Vm, V1, V2, V3, I1, I2, and I3 are supplied to a CPU 39.

Upon reception of the seven signals, the CPU 39 calculates the voltage drops Vr1, Vr2, and Vr3 caused by the resistances of the primary, secondary, and tertiary windings 4, 5, and 6, respectively using the above-mentioned equations (1), (2), and (3). When the voltage drop Vr1, Vr2, or Vr3 falls outside a predetermined range, the CPU 39 determines quench, and sends the output h. The CPU 39 also outputs a signal for causing a display unit 40 to display a name of a quenched winding.

FIRST FUNCTION

With this arrangement, when the primary winding 4 is quenched, for example, Vm and I1 are decreased, as can be seen from Table 1 and, hence, Vr1 is increased. When Vr1 is increased beyond the predetermined range, the CPU 39 determines that the primary winding 4 is quenched, sends the output h, and outputs a display signal for displaying that the primary winding 4 is quenched. As a result, the operation of the gate drive circuit 20 is stopped, and the thyristors 9a and 9b are turned off, thus disconnecting the superconductive transformer 1 from the AC power source 12. The display unit 40 displays a message indicating that the primary winding 4 is quenched.

When the secondary or tertiary winding 5 or 6 is quenched, the superconductive transformer 1 is similarly disconnected from the AC power source 12, and a name of the quenched winding is displayed on the display unit 40. Therefore, the quench occurring in each winding can be detected in a short response time, and the superconductive transformer 1 can be disconnected from the AC power source 12 as soon as possible.

In the first embodiment, voltage drops due to the resistances of the windings are detected, and when the voltage drop falls outside the predetermined range. quench is determined. Therefore, quench detection can be satisfactorily performed regardless of types of loads connected to the transformer. Not only quench detection but also measurement of energy loss caused by quench can also be performed.

As has been described above with reference to Table 1, when a winding is quenched, V1, V2, V3, Vm, I1, I2, and I3 are changed in patterns unique to the quenched winding. Therefore, a function of only discriminating occurrence of quench and detecting a quenched winding based on the above-mentioned changes in patterns may be provided. The first embodiment can be further expanded, and may be applied to a superconductive transformer comprising primary, secondary, tertiary, .. ., Nth order (N is an integer not less than 3) windings.

Since the terminal voltage of the primary winding is left unchanged regardless of quench and need not be detected, a detection means for it may be omitted to attain a simple arrangement.

FIRST EFFECT

The system of the first embodiment can detect the number of quenched windings.

Even when changes in linkage inductances of windings occur, the voltages and currents of the primary and tertiary windings which vary depending on types of load in the circuit are calculated by equations which are free from the influence on quench detection results caused by such changes. Therefore, precise quench detection can be performed.

SECOND EMBODIMENT

The present invention is not limited to the number of windings. When the present invention is applied to a so-called primary superconductive transformer comprising only two windings, i.e., primary and secondary windings, another effect can be expected.

SECOND FUNCTION

Figure 2:
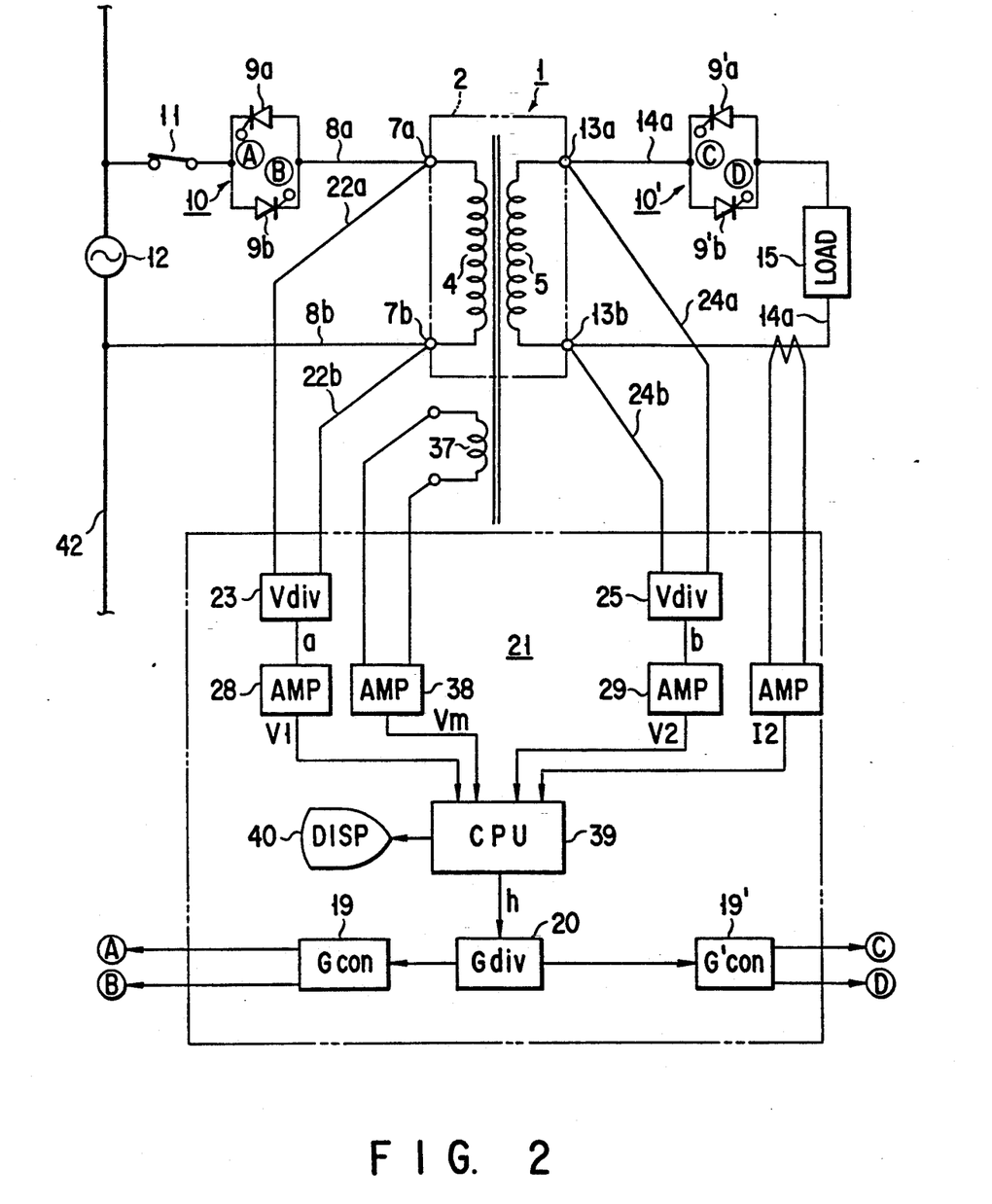
FIGS. 2 and 3 are circuit diagrams of supervisory systems for a superconductive transformer according to other embodiments of the present invention.

As shown in FIG. 2, a supervisory system 21 according to the second embodiment mainly comprises signal lines 22a and 22b, and signal lines 24a and 24b which are connected to the two ends 7a and 7b and the two ends 13a and 13b of the primary and secondary windings 4 and 5 constituting the superconductive transformer 1, a voltage divider 23 and an insulated amplifier 28 connected to the signal lines 22a and 22b, a voltage divider 25 and an insulated amplifier 29 connected to the signal lines 24a and 24b, a magnetic flux detection winding 37 wound around the core 3, an insulated amplifier 38 connected to the two ends of the winding 37, a CPU 39 for receiving and processing voltage signals V1, V2, and Vm from the insulated amplifiers 28, 29, and 38, a display unit 40 connected to the CPU 39, a gate drive circuit 20 and a gate control circuit 19 which are operated in accordance with a disconnection instruction signal h from the CPU 39, and thyristors 9a and 9b for opening/closing the circuit based on a control signal from the control circuit 19. That is, when the superconductive transformer 1 comprises the primary and secondary windings, insulated amplifiers 34, 35, and 36 associated with current signals of the windings, and the insulated amplifier 30 associated with the voltage signal V3 of the tertiary winding 6 can be omitted from the main constituting elements of the first embodiment shown in FIG. 1. If only a quenched winding is to be detected, change patterns of voltage signals V1 and V2 in the windings when quench occurs need only be observed, and current signals I1, I2, I3, ... In are not taken into consideration.

Furthermore, as can be seen from Table 2 below, only the voltage signal Vm is supervised, and when Vm is decreased, quench in the primary winding can be detected. Only the voltage signal V2 is supervised (that is, Vm is left unchanged), and when V2 is decreased, quench in the secondary winding can be detected.

In this manner, the voltage signal V1 is unnecessary for detecting quench in the primary and secondary windings, and need not be detected.

The constituting elements of the second embodiment are operated in the same manner as in the first embodiment, and a detailed description thereof will be omitted.

Table 2 below shows changes in voltage signals V1, V2, and Vm of the primary and secondary windings 4 and 5, and the magnetic flux detection winding 37.

TABLE 2

|  | Primary Winding Quench | Secondary Winding Quench |
| --- | --- | --- |
| V1 | → | → |
| V2 | ↓ | ↓ |
| Vm | ↓ | → |

SECOND EFFECT

The supervisory system 21 of this embodiment can be realized by an arrangement simpler than that of the first embodiment. When change patterns are detected, as shown in Table 2, the superconductive transformer 1 can be quickly disconnected from a power source 12 as needed.

THIRD EMBODIMENT

Figure 3:
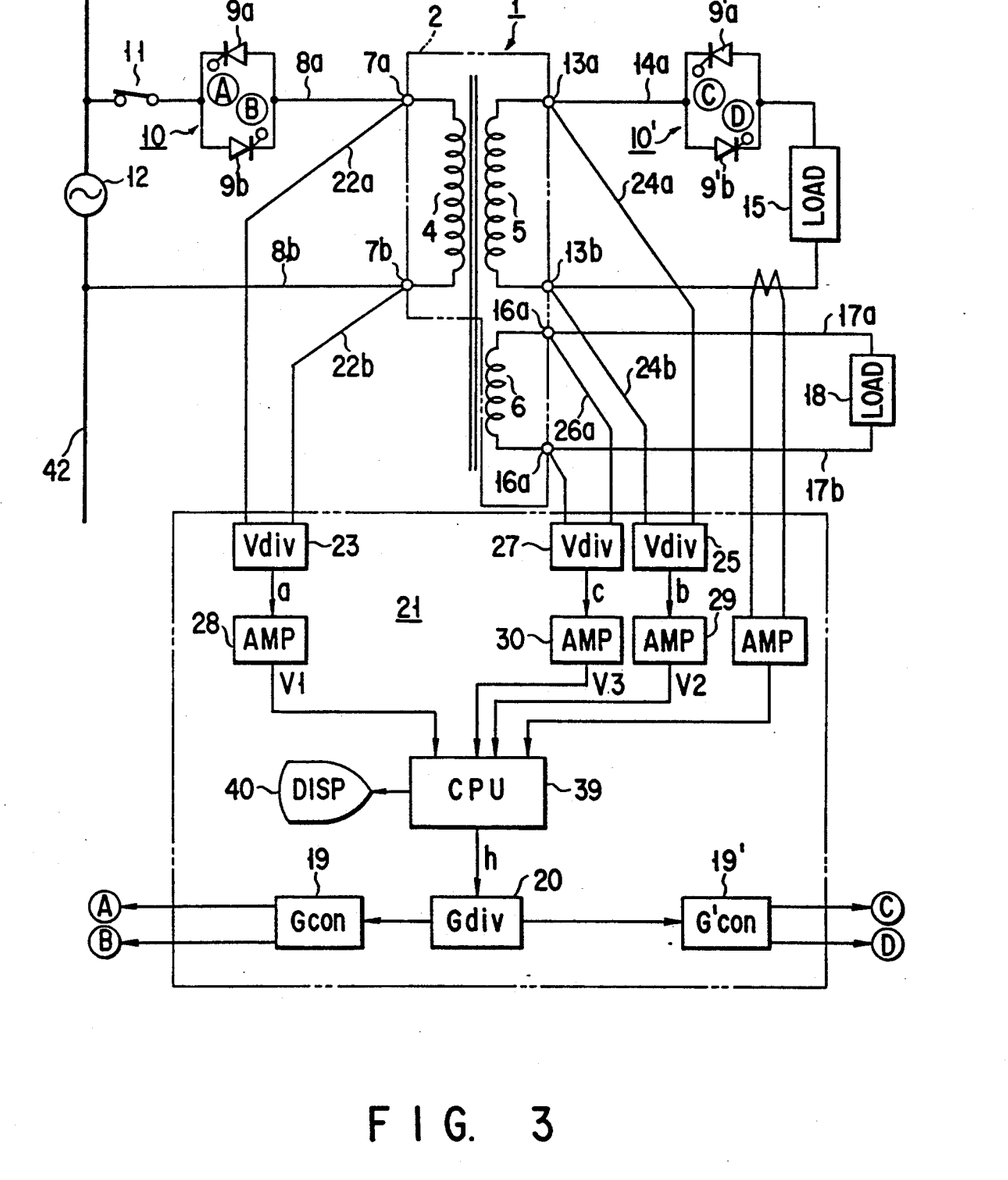

As shown in FIG. 3, in a quench supervisory system 21 according to the third embodiment, when a superconductive transformer comprises primary to Nth-order windings, the insulated amplifiers 34, 35, and 36 associated with the current signals I1, I2, I3, ..., In of the windings, the magnetic flux detection winding 37, and the insulated amplifier 38 may be omitted from the main constituting elements of the first embodiment shown in FIG. 1. If only a quenched winding is to be detected, change patterns of voltage signals V1, V2, V3, ..., Vn in the windings during occurrence of quench need only be observed, and current signals I1, I2, I3, .., In are not taken into consideration. Furthermore, the voltage signal V1 need not be observed as in the above embodiment. In this embodiment, however, this signal is not omitted.

THIRD FUNCTION

Changes in voltages indicated by voltage signals V1, v2. V3, ..., Vn input to a CPU 39 via N voltage dividers 23, 25, 27, ..., corresponding to primary to Nth-order windings and insulated amplifiers 28. 29, 30, ... are detected by the CPU 39. Once change patterns shown in Table 3 below appear, a message indicating that quench occurs is displayed on a display unit 40 connected to the CPU 39. A gate drive circuit 20 operated according to a disconnection instruction signal h from the CPU 39 and thyristors 9a and 9b operated according to a gate control circuit 19 disconnect, from a circuit, a power source 12 for supplying an electrical power to a superconductive transformer 1.

TABLE 3

|  | Primary Winding Quench | Secondary Winding Quench | Tertiary Winding Quench | ... | Nth-order Winding Quench |
| --- | --- | --- | --- | --- | --- |
| V1 | → | → | → | ... | → |
| V2 | ↓ | ↓ | → | ... | → |
| V3 | ↓ | → | ↓ | ... | → |
| . | . | . | . |  | . |
| . | . | . | . |  | . |
| . | . | . | . |  | . |
| Vn | ↓ | → | → | ... | → |

THIRD EFFECT

The quench supervisory system 21 according to the third embodiment can detect a quenched winding with a simple arrangement. When change patterns shown in Table 3 are detected, the power source 12 of the superconductive transformer 1 can be quickly disconnected from the circuit, as needed.

MODIFICATION

In each of the above embodiments, the voltage dividers 23, 25, and 27, and the insulated amplifiers 28, 29, and 30 are separately arranged, but may be integrally arranged as voltage transformers. Various changes and modifications may be made within the spirit and scope of the invention.

Figure 5:
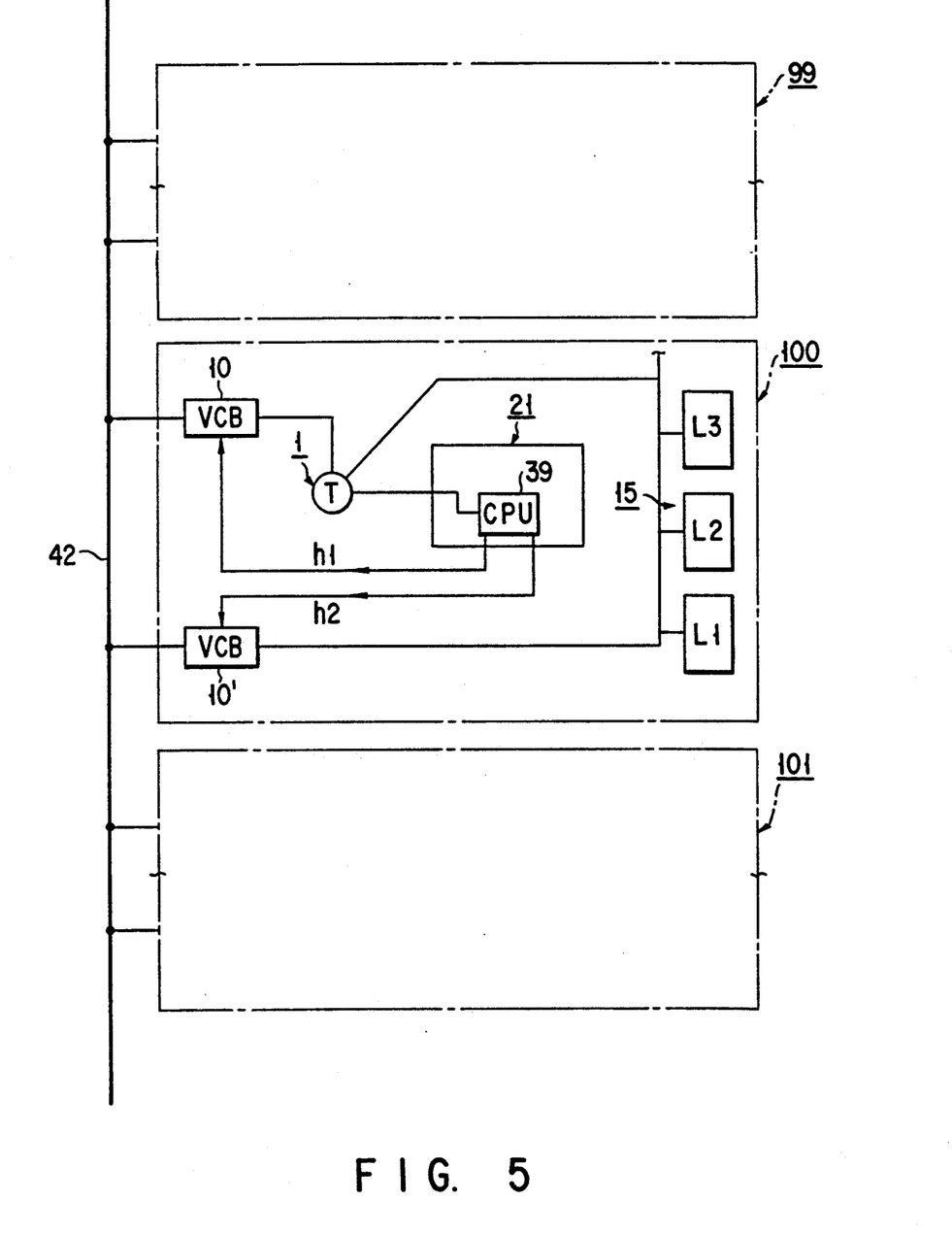
FIG. 5 is a sectional view showing an arrangement of the system construction.

As shown in FIG. 5, a plurality of the supervisory systems 99,100,101 are connected in parallel with the AC power source 42 via VCB10 and VCB10'.

Each supervisory system also comprises two VCB5 10,10' as semiconductor switches, superconductive transformer 1, a supervisory main system 21 and a plurality of loads 15.

In the above-described manner, a whole system can be constructed containing a plurality of superconductive transformers.

As described above, the quench supervisory system of the present invention can very easily detect a quenched winding in a short response time even in a superconductive transformer comprising a large number of windings. Therefore, a supervisory system which can take an appropriate countermeasure against a quenched winding can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A supervisory apparatus for detecting a quench in a superconductive transformer having a primary winding connected to a power source and a secondary winding connected to a load, the primary and secondary winding being formed of superconductive lines and wound around an outer periphery of a common core, comprising:
   a voltage detector connected across the secondary winding having an output corresponding to a detected voltage across the secondary winding;
   a magnetic flux detector mounted on the common core having an output corresponding to a detected magnetic flux created at the common core;
   determining means, connected to the output of said voltage detector and to the output of said magnetic flux detector, for determining occurrence of a quench in the primary winding when there occurs a variation in the output of said magnetic flux detector and occurrence of a quench in said secondary winding when there occurs a variation in the output of the voltage detector, and for generating a quench output signal when an occurrence of a quench has been determined; and
   transformer protection means, connected to said determining means, for protecting said superconductive transformer from quench on a basis of said quench output signal.

2. The supervisory apparatus according to claim 1, wherein said transformer protection means comprises:
   power supply interrupting means, responsive to the quench output signal output on a determination of a quench in the primary winding by said determining means, for interrupting conduction between the primary winding and the power source; and
   means, responsive to the quench output signal output on a determination of a quench in the secondary winding by said determining means, for disconnecting the load from the secondary winding.

3. The supervisory apparatus according to claim 1, wherein the transformer protection means comprises:
   gate drive circuit means, responsive to the quench output signal form said determining means, for discriminating a type of quench output signal and for transmitting a predetermined signal on the basis of the type of quench output signal;
   first gate control circuit means, responsive to the predetermined signal from said gate drive circuit means, for transmitting a control signal to a power supply interrupting means; and
   second gate control circuit means, responsive to the predetermined signal from said gate drive circuit means, for transmitting a control signal to a load disconnecting means.

4. The supervisory apparatus according to claim 1, further comprising:
   means for, when a quench is determined to be occurring, allowing a present state of voltage, current and temperature at the load or power source to be displayed, in a predetermined format, as information relating to the occurrence of the quench.

5. The supervisory apparatus according to claim 1, further comprising:
   displaying means for displaying a present state of voltage, current and temperature of the load or power source in a predetermined form, as information relating to the generation of the quench.

6. The supervisory apparatus according to claim 1, wherein said voltage detecting means is comprised of a digital voltmeter connected to at least one of said primary or secondary winding to detect a voltage there across.

7. A supervisory apparatus for a superconductive transformer which detects a quench in each of primary, secondary, . . . , N-order windings made of superconductive lines and wound around an outer periphery of a common core, where N is an integer greater than 3, comprising:
   a voltage detector connected across at least one of the secondary or higher-order windings and having an output corresponding to a detected voltage level;
   determining means, connected to the output of said voltage detector, for determining occurrence of a quench in the primary winding when there occurs across the secondary winding, . . . , and the N-order winding supplied from said voltage detector, occurrence of a quench in the secondary winding when there occurs a variation in voltage across the secondary winding supplied from said voltage detector, and occurrence of a quench in the N-order winding when there occurs a variation in a voltage across the N-order winding supplied from said voltage detector, and for generating a quench output signal based on a result of determination; and
   transformer protection means, connected to said determining means, for protecting said superconductive transformer from quench on the basis of the quench output signal received from said determining means.

8. The supervisory apparatus according to claim 7, wherein said transformer protection means comprises:
   power supply interrupting means for interrupting conduction between the primary winding and a power source when a determination of a quench in the primary winding is made by said determining means and a corresponding quench output signal is received from said determining means; and
   load disconnecting means for disconnecting a load from any of the secondary, . . . , and N-order windings when the determination of a quench in any of the secondary, . . . , and N-order windings is made and a corresponding quench output signal is received from said determining means.

9. The supervisory apparatus according to claim 8, further comprising:
   voltage detecting means for detecting a voltage across the primary winding;
   current detecting means, for detecting a variation in a current in the primary, . . . , and N-order windings;

magnetic flux detecting means mounted on an iron core; and wherein;

said determining means receives an output signal of said magnetic flux detecting means, an output signal of said voltage detecting means and an output signal of said current detecting means, calculates a voltage drop across a resistance in a respective winding, and determines occurrence of a quench in any of the windings on the basis of a level of a corresponding voltage drop.

10. The supervisory apparatus according to claim 9, wherein said determining means calculates the voltages Vr1, Vr2 and Vr3 across the primary, secondary and tertiary windings, based on $$Vr1 = I1 \cdot R1 = V1 - Vm1 - jX1 \cdot I1$$

$$Vr2 = I2 \cdot R2 = Vm2 - V2 - jX2 \cdot I2$$

$$Vr3 = I3 \cdot R3 = Vm3 - V3 - jX3 \cdot I3$$

wherein n = 1 to 3 and

Rn: a resistance of the N-order winding;
In: an N-order winding current;
Vn: an N-order winding voltage;
Vmn: an N-order winding induction voltage; and
jxn: of an N-order winding and;

when Vr1, Vr2 and Vr3 are out of a predetermined range, said determining means determines an occurrence of a quench in any of the windings.

11. The supervisory apparatus according to claim 9, wherein said determining means comprises a memory means, connected to said voltage detector, said voltage detecting means, said current detecting means and said magnetic flux detecting means, for storing output signals supplied from said detector and detecting means.

12. The supervisory apparatus according to claim 9, wherein said determining means comprises a register, connected to said voltage detector, said voltage detecting means, said current detecting and said magnetic flux detecting means, for storing output signals from said detector and detecting means as binary information.

13. The supervisory apparatus according to claim 9 wherein said power supply interrupting means comprises a plurality of thyristors connected as a circuit across the primary winding of the superconductive transformer and said power source is in a parallel and opposing relation and electrically interrupts the circuit when a signal indicting a quench is issued from any of said detector and determining means.

14. A superconductive system comprising:
an alternating power supply;
a superconductive transformer system connected to said power supply including a superconductive transformer having a common core around which a primary winding and a secondary winding connected to at least one load are wound; and
a supervisory apparatus for detecting a quench in the primary and secondary windings including determining means for receiving a plurality of input data supplied from the superconductive transformer at predetermined areas, for determining occurrence of a quench in any of the windings on the basis of a variation of the input data and for transmitting a predetermined signal indicating an occurrence of a quench in the superconductive transformer;
current supply interrupting means, responsive to the predetermined signal from the determining means of the supervisory apparatus, for interrupting conduction between the primary winding and the power supply; and
load disconnecting means, responsive to the predetermined signal from the determining means of the supervisory apparatus, for disconnecting the load from the secondary winding.

15. A superconductive system according to claim 14, wherein said supervisory apparatus comprises:
first voltage detecting means for detecting a voltage across the primary winding;
first voltage amplifying means for amplifying the voltage detected by said first voltage detecting means;
second voltage detecting means for detecting a voltage across the secondary winding;
second voltage amplifying means for amplifying the voltage detected by said second voltage detecting means;
magnetic flux detecting means, mounted on the common core, for detecting a magnetic flux induced in the common core;
third amplifying means for amplifying a magnitude of a magnetic flux or current detected by said magnetic flux detecting means; and
said determining means is connected to said first voltage amplifying means, second voltage amplifying means and third voltage amplifying means, and is for receiving a plurality of voltage values as the input data from the amplifying means, for determining occurrence of a quench in any of the windings, in accordance with a predetermined combination pattern, on a basis of a voltage variation pattern detected by said second voltage detecting means and magnetic flux detecting means, and for transmitting the predetermined signal.

* * * * *